United States Patent
Humpert et al.

[11] Patent Number: 6,085,790
[45] Date of Patent: Jul. 11, 2000

[54] DUAL-FLOW FAUCET HEAD

[75] Inventors: Jürgen Humpert, Hemer; Bruno Heimann; Eckhard Gransow, both of Fröndenberg; Harald Dickel, Iserlohn, all of Germany

[73] Assignee: Friedrich Grohe AG, Hemer, Germany

[21] Appl. No.: 09/228,743

[22] Filed: Jan. 12, 1999

[30] Foreign Application Priority Data

Jan. 30, 1998 [DE] Germany .......................... 198 03 554

[51] Int. Cl.⁷ .................................................. E03C 1/04
[52] U.S. Cl. .............................. 137/801; 4/678; 239/447; 239/449
[58] Field of Search ................................ 4/678; 137/801; 239/445, 447, 449

[56] References Cited

U.S. PATENT DOCUMENTS

| | | | |
|---|---|---|---|
| 4,606,370 | 8/1986 | Geipel et al. | 137/801 X |
| 4,703,893 | 11/1987 | Gruber | 239/449 X |
| 5,145,114 | 9/1992 | Monch | 239/447 X |
| 5,383,604 | 1/1995 | Boesch | 239/447 |
| 5,707,011 | 1/1998 | Bosio | 239/447 |
| 5,758,690 | 6/1998 | Humpert . | |
| 5,772,120 | 6/1998 | Huber | 239/447 X |

FOREIGN PATENT DOCUMENTS 33 06 947   8/1994   Germany .

*Primary Examiner*—Gerald A. Michalsky
*Attorney, Agent, or Firm*—Herbert Dubno; Andrew Wilford

[57] ABSTRACT

A faucet has a tubular faucet arm, a water-pressurizable hose in the arm having an outer end, and a head housing mounted on the hose outer end, extending along an axis, formed with a radially throughgoing slot, and dimensioned to be grasped in one hand. Body structure in the head communicates with the hose outer end and forms first and second valve seats and a nozzle assembly mounted on the body structure forms a first outlet communicating with the first valve seat and a second outlet communicating with the second valve seat. A valve element is displaceable in the body structure between a first end position engaging the first seat and diverting flow from the hose to the first outlet and a second end position engaging the second seat and diverting flow from the hose to the second outlet. A lever partially projecting through the slot from the housing is pivoted on the body structure. This lever is coupled to the valve element for displacing it from the first and position to the second end position on depression of the lever toward the housing. Normally a spring is braced between the body structure and the valve element to urge the valve element into the first end position.

17 Claims, 7 Drawing Sheets

DUAL-FLOW FAUCET HEAD

FIELD OF THE INVENTION

The present invention relates to a faucet head. More particularly this invention concerns such a head normally mounted on a hose end so that it can be pulled out and set up to provide two different flows, normally a stream and a spray.

BACKGROUND OF THE INVENTION

Commonly owned U.S. Pat. No. 5,758,690 describes a faucet having a base provided with a valve for supplying water under pressure and a tubular U-shaped spout having an inner end pivotal in the base and an opposite downwardly directed outer end forming a downrnwadly open seat. A boat bas an inner end connected in the base to the water-supply valve, an intermediate portion extending through the tubular spout, and an outer end carrying an end fitting formed with a rearwardly directed abutment and fittable in the seat of the spout in a seated position with the abutment engaged against the spout outer end. Thus with this system the entire faucet arm can be picked up and manipulated, for instance to fill a bucket too large to fit beneath the faucet in a sink.

German patent document 3,306,947 filed Feb. 28, 1983 by A. Gottwald describes a dual-flow spray head. Flow normally exits this head as a stream via a central opening equipped with an aerator. When a button on the back of the spray head is depressed, the flow is diverted to an array of annular spray nozzles. Such a system therefore allows the person holding the spray head to readily switch between these two flow systems.

OBJECTS OF THE INVENTION

It is therefore an object of the present invention to provide an improved faucet head.

Another object is the provision of such an improved faucet head which overcomes the above-given disadvantages, that is which is easy to use, provides two different flows, and advances the principles and concepts basically set out in the above-described prior-art systems.

SUMMARY OF THE INVENTION

A faucet has according to the invention a tubular faucet arm, a water-pressurizable hose in the arm having an outer end, and a head housing mounted on the hose outer end, extending along an axis, formed with a radially throughgoing slot, and dimensioned to be grasped in one hand. Body structure in the head communicates with the hose outer and and forms first and second valve seats and a nozzle assembly mounted on the body structure forms a first outlet communicating with the first valve seat and a second outlet communicating with the second valve seat. A valve element is displaceable in the body structure between a first end position engaging the first seat and diverting flow from the hose to the first outlet and a second end position engaging the second seat and diverting flow from the hose to the second outlet. A lever partially projecting through the slot from the housing is pivoted on the body structure. This lever is coupled to the valve element for displacing it from the first end position to the second end position on depression of the lever toward the housing. Normally according to the invention a spring is braced between the body structure and the valve element to urge the valve element into the first end position.

Thus with this arrangement the head can be pulled out of the faucet and used either to emit a stream from the first outlet or, by actuation of the lever, a spray from the second outlet. Even when still engaged in the faucet, the lever can be depressed to make the faucet a sprayer.

According to the invention the lever is V-shaped and has a pair of arms joined at a bight. One of the arms has an outer end coupled by the means to the valve element. The other of the arms has an outer end pivoted on the body structure. The bight projects out through the slot. Normally for comfort the other arm is arcuate. The lever is unitarily formed of plastic with a pair of pivot pins and the structure has seats receiving the pins. In addition a flexible membrane covering the head housing at the slot is engaged over the other arm and bight of the lever. This membrane can cover the entire head housing and have a raised portion at the slot to give the dual-flow head of this invention a very nice appearance.

The structure includes a head body formed with a tubular stem connected to the hose and forming a passage and with a base plate formed with a seat pivotally supporting the other-arm outer end. The structure also includes a valve body mounted on the head body and forming the seats. The passage opens between the seats. The tubular stem extends at an angle of about 60° to a plane of the base plate. In addition the valve body is formed with barbed snap arms that elastically engage and hold the head body and with a threaded seat and the valve nozzle assembly is threaded into the seat. The first outlet is a central stream outlet and the second outlet is an annular array of nozzles surrounding the central stream outlet. These bodies in accordance with the invention are formed with an axially throughgoing sealed hole and the valve element has a stem sealingly engaged in the hole and having an upper end connected to the one-arm outer end and a lower end formed with a valve ring sealingly engageable with the seats. The valve-element upper end is formed with an annular outwardly open groove and the one-arm outer end is forked and engaged in the groove.

The head housing according to the invention flares away from the hose. In addition the structure is formed with a support rib and a nut secures the hose to the structure and retains the head housing against the support rib. The nut fits snugly in an end of the faucet arm. Furthermore the head housing has an axial length equal to about twice its largest diameter and the faucet arm and the housing are curved and meet at a region of similar curvature. The housing has at this region a diameter slightly greater than a diameter of the faucet arm at the region and flaring outward from the region. The slot is on an inner side of a curvature of the head housing. This gives the head an extremely attractive appearance, like a continuation of the faucet arm, yet still makes it comfortable and easy to use as a pull-out sprayer.

BRIEF DESCRIPTION OF THE DRAWING

The above and other objects, features, and advantages will become lore readily apparent from the following description, reference being made to the accocpanying drawing in which.

SPECIFIC DESCRIPTION

Figure 1:
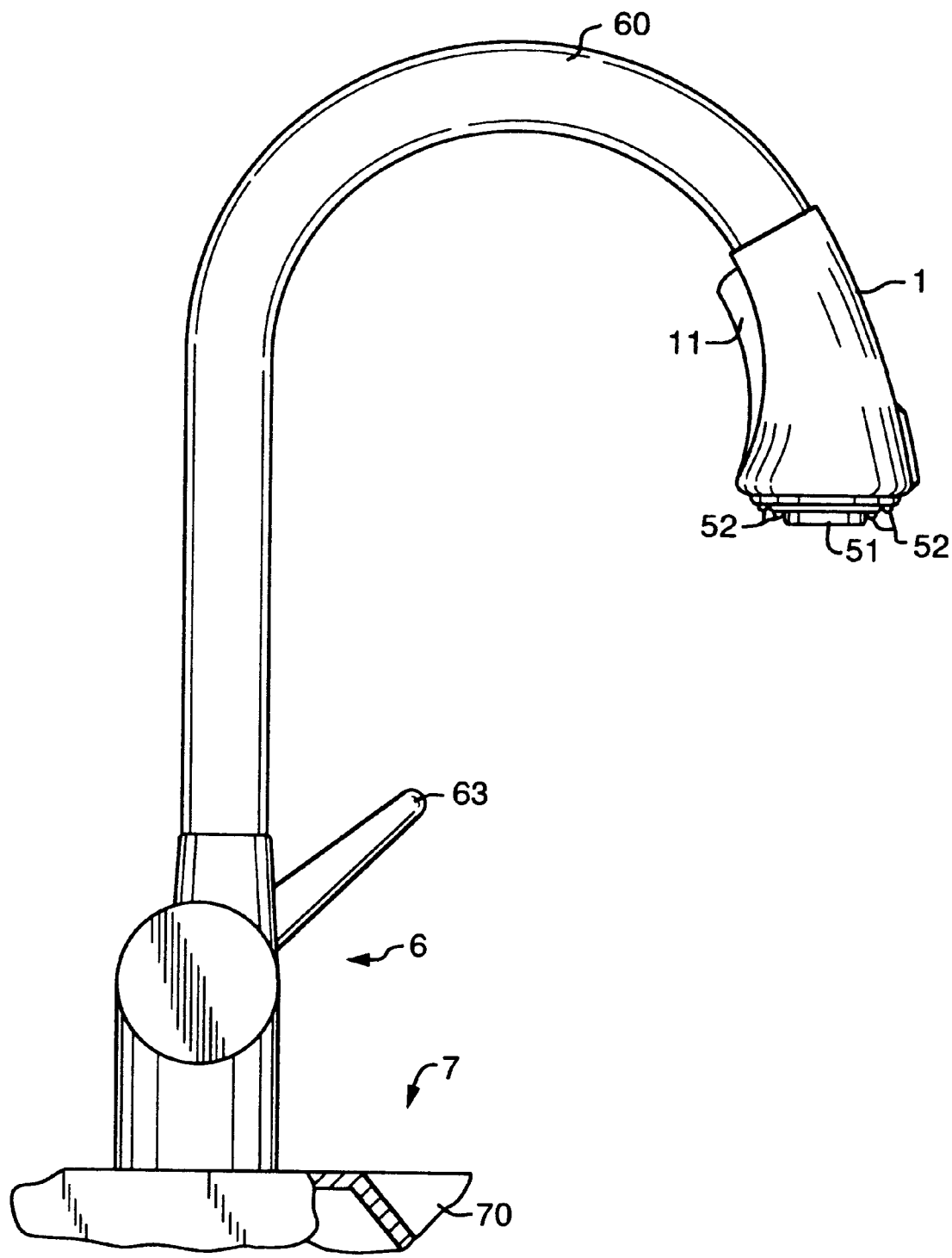
FIG. 1 is a side view of a faucet according to the invention.
Figure 2:
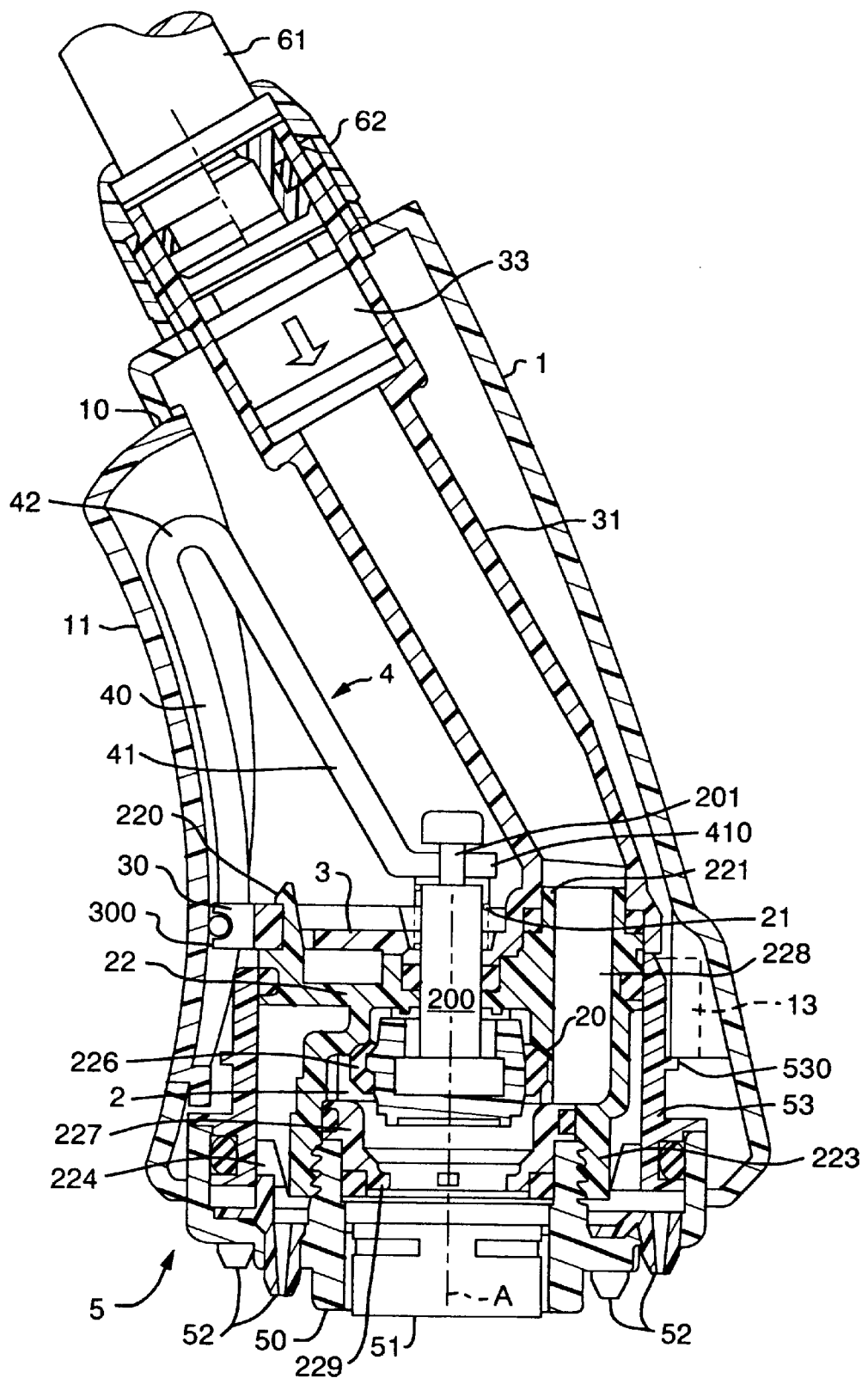
FIG. 2 is a section through the faucet head in accordance with the invention.

As seen in FIG. 1 a faucet head has a housing 1 mounted on the outer end of an inverted-J faucet arm 60 whose opposite end is pivoted about a vertical axis on a control valve 6 mounted on a deck 7 adjacent a sink 10. FIG. 2 show how the head housing 1 is secured by a nut 62 on a hose 61 that extends as is well known in the art back up through the arm 60, down beneath the deck 7, and back up to connection to a mixed-water outlet of the valve 6 which has an arm 63 that is moved up and down to control volume of flow and from side to side to control water temperature, once again all as well known in the art. The head housing 1 holds a switch-over valve 2, a head body 3, an actuating element 4, and a nozzle assembly 5.

Figure 3:
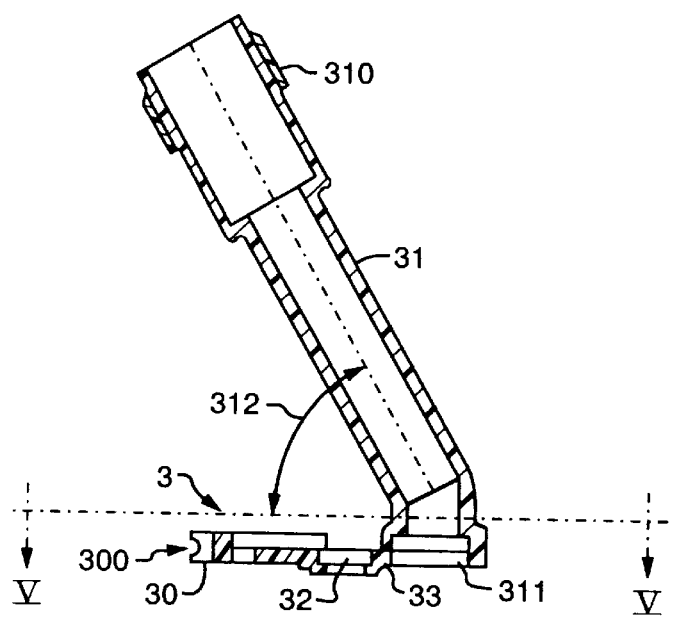
FIG. 3 is a section through the body of the faucet head.
Figure 4:
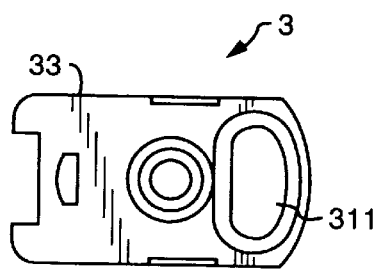
FIG. 4 is a bottom view of the faucet-head body.
Figure 5:
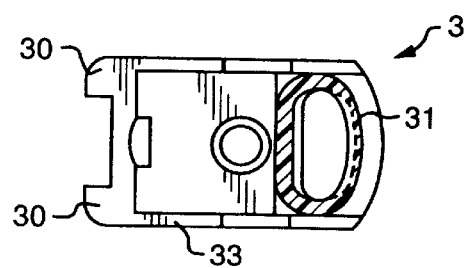
FIG. 5 is a section taken along line V—V of FIG. 3.

FIGS. 2 through 4 further show the head body 3 is comprised of a base plate 33 and a tubular stem 31 unitarily formed of metal or rigid plastic. The upper end of the stem 31 is formed with a screwthread 310 that allows the hose 61 to be secured to it by the nut 62 and a lower end opens at a port 311 in the plate 33, next to a central hole or port 32. A check valve 33 serving to prevent back flow is provided in the upper end of the stem 31. The side of the plate 33 opposite the port 311 is formed as a seat 30 with a pair of aligned gudgeon grooves 300. The stem 31 extends at an angle 312 of about 60° to a plane of the base plate 33.

Figure 6:
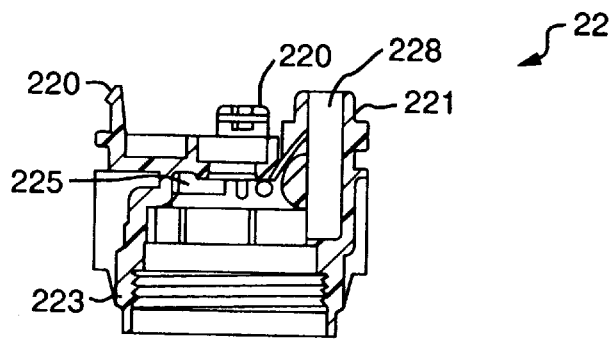
FIG. 6 is a section through the body of the switch-over valve of the faucet head.
Figure 7:
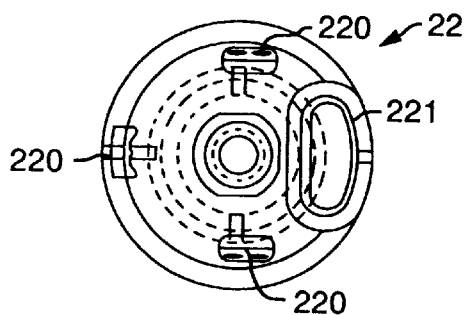
FIG. 7 is a top view of the switch-over-valve body.
Figure 8:
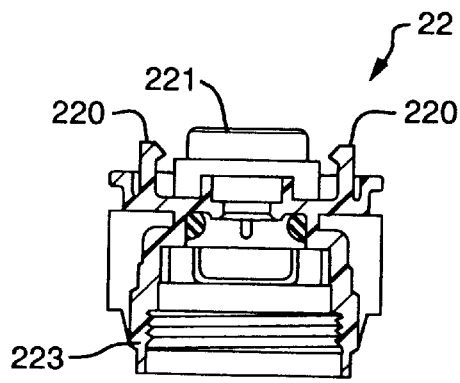
FIG. 8 is a section through the switch-over-valve body taken at 90° to the section of FIG. 6.

The switch-over valve 2 has a body 22 shown in FIGS. 2 and 6 to 8 that is secured to the head body 3 by three snap arms 220 and that has a collar 221 that fits sealingly into the lower end of the port 311 and forms a passage 228. Furthermore the valve body 22 fits sealingly around the central port 32 of the head body 3 and forms an upper seat 226 aligned along an axis A with this port 32. The valve body 22 is further provided below the seat 226 with a removable insert ring 229 forming a lower seat 227. The lower portion of this valve body 22 is formed with an internal screwthread 223, and the upper portion with radially throughgoing apertures 25 (FIG. 6)

A valve element 200 (FIG. 2) formed as a stepped cylindrical stem that extends axially through the port 32 and has an upper end formed with a radially outwardly open groove 201 and a lower end provided with an elastomeric valve ring 20. A coil spring 21 urges element 200 upward to press the ring 20 into engagement with the upper seat 226. The ring 229 is removable to allow installation of a valve element 200.

Figure 9:
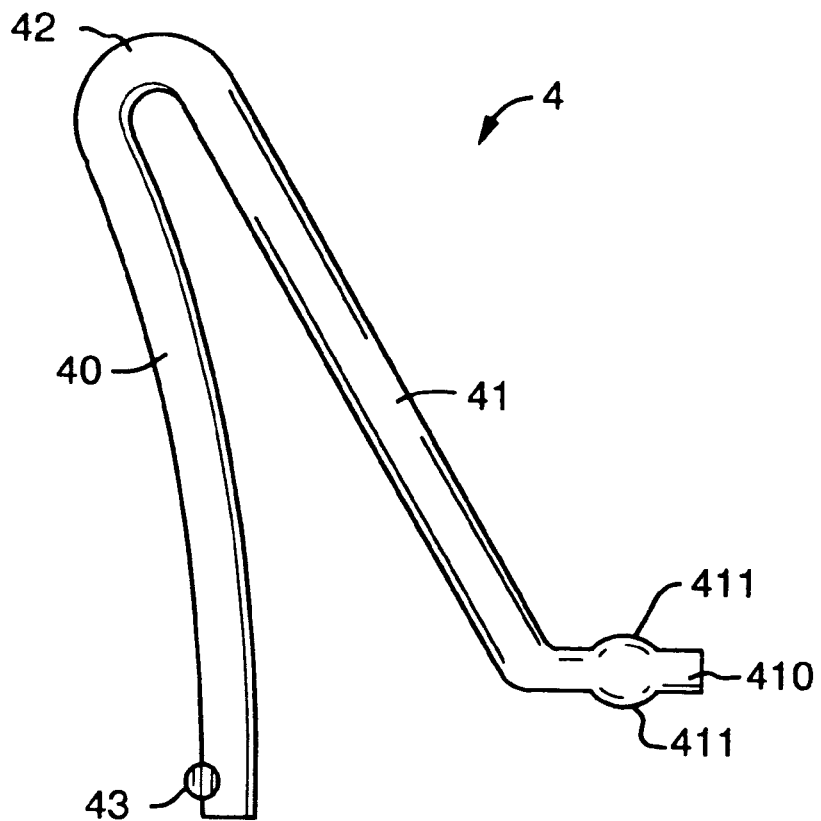
FIG. 9 is a side view of the actuating lever.
Figure 10:
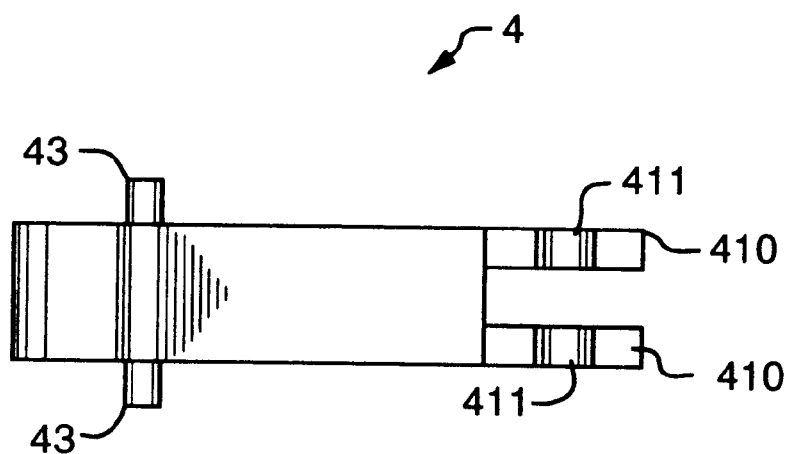
FIG. 10 is a top view of the actuating lever.
Figures 11, 12:
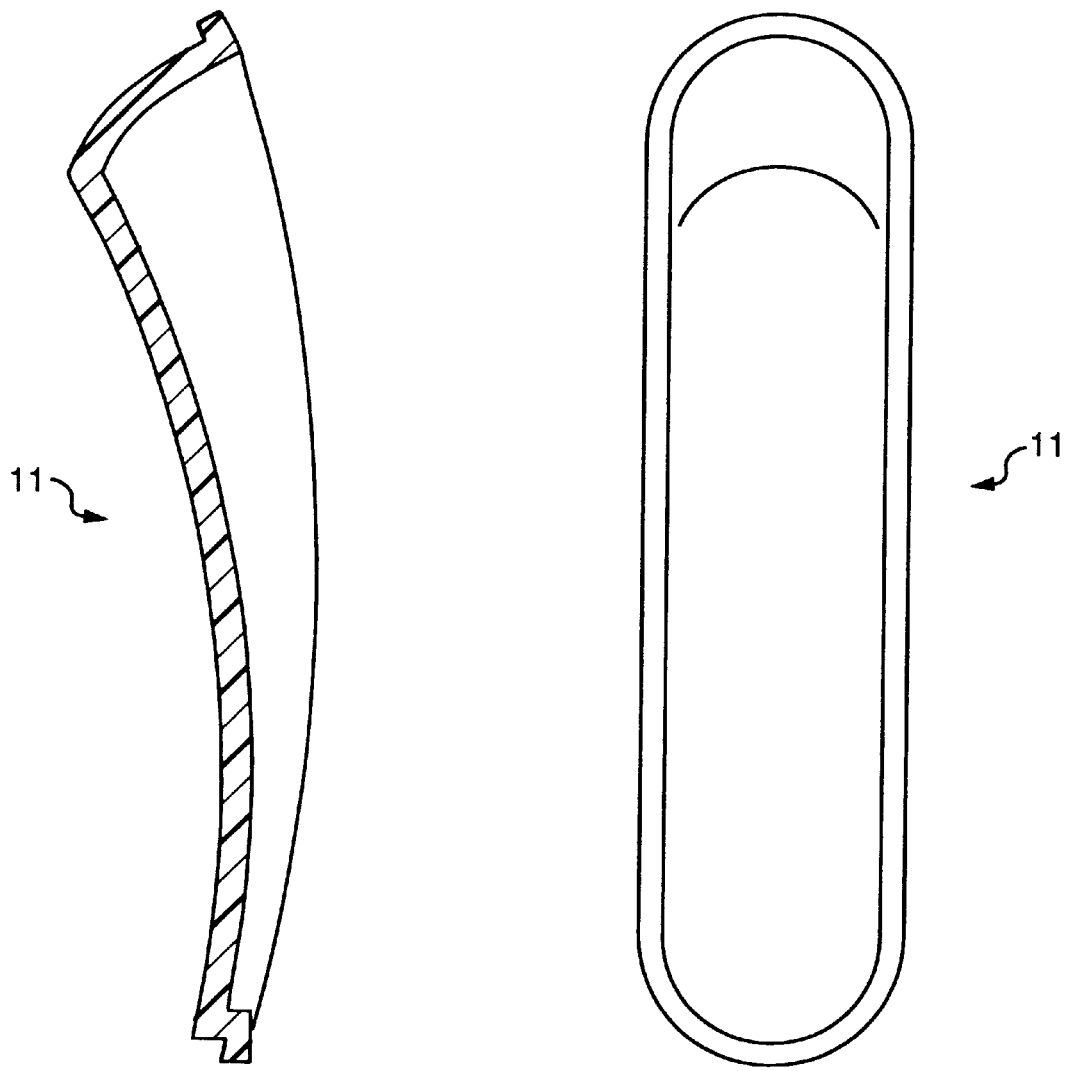
FIG. 11 is a section through the membrane.
FIG. 12 is a front view of the membrane.

The actuating element 4 shown in FIGS. 9 and 10 has a pair of arms 40 and 41 connected by a bight 42 and is fairly rigid. The outer end of the arm 40 is formed with a pair of pivot pins 43 seated in the gudgeon grooves 300 of the plate 33 and the outer end of the arm 41 is forked and formed with a pair of sides 410 having round bearing parts 411 that fit in the groove 201 of the valve element 200. The head housing 1 is formed with an axially extending and radially outwardly open slot 20 through which the arm 40 extends and an elastomeric membrane 11 (FIGS. 11 and 12) fits in this slot around the arm 40 to cover the element 4 and provide an attractive appearance to the head housing 1. Thus when the membrane 11 and element 4 are pressed inward, the valve element 200 will be pushed down against the force of the spring 21 to pull the ring 20 off the seat 226. The passage 228 of the stem 221 opens into the valve body 22 below this seat 226.

The nozzle assembly 5 has a body 50 threaded into the screwthread 223 in the bottom of the valve body 22 to secure in place the removable insert ring 229 forming the lower seat 227 below and coaxial with the seat 226. The body 50 is centrally provided with an aerator 51 forming a central stream outlet, and is provided therearound with two rings of spray nozzles 52 forming an annular spray outlet. The body 50 further carries an outer sleeve 53 that engages sealingly up and around the valve body 22 to form therewith an outer compartment 224 that communicates via the apertures 225 with the interior of the body 22. This sleeve 53 is formed with a radially outwardly projecting ridge 530 that engages axial ribs 13 formed in the head housing 1, so that this head housing 1 is axially engaged between this ridge 530 and the nut 62.

This system functions as follows:

For normal faucet use, the head housing 1 normally fits complementarily as shown in FIG. 1 to the upper end of the faucet arm 60, with the nut 62 recessed in the arm 60 and the housing 1 forming a smooth continuation of the arm 60. The spring 21 holds the valve ring 20 up against the seat 226, forcing flow from the passage 228 of the stem 221 into the valve body 22 below the seat 226 so that this flow is diverted downward through the aerator 51 as a central stream into the sink 70.

For use as a sprayer the head 1 is gripped so as to depress the membrane 11 and, if desired, is pulled out of the end of the faucet arm 60. Depressing the membrane 11 pivots the element 4 about the pivot pins 43, pressing down the valve element 200 against the force of the spring 21 so as to bring the valve ring 20 into engagement with the seat 227. This action blocks flow from the passage 28 downward out of the aerator 51 and instead diverts it through the apertures 25 and compartment 224 to the nozzles 52 to generate an annular spray.

Figure 13:
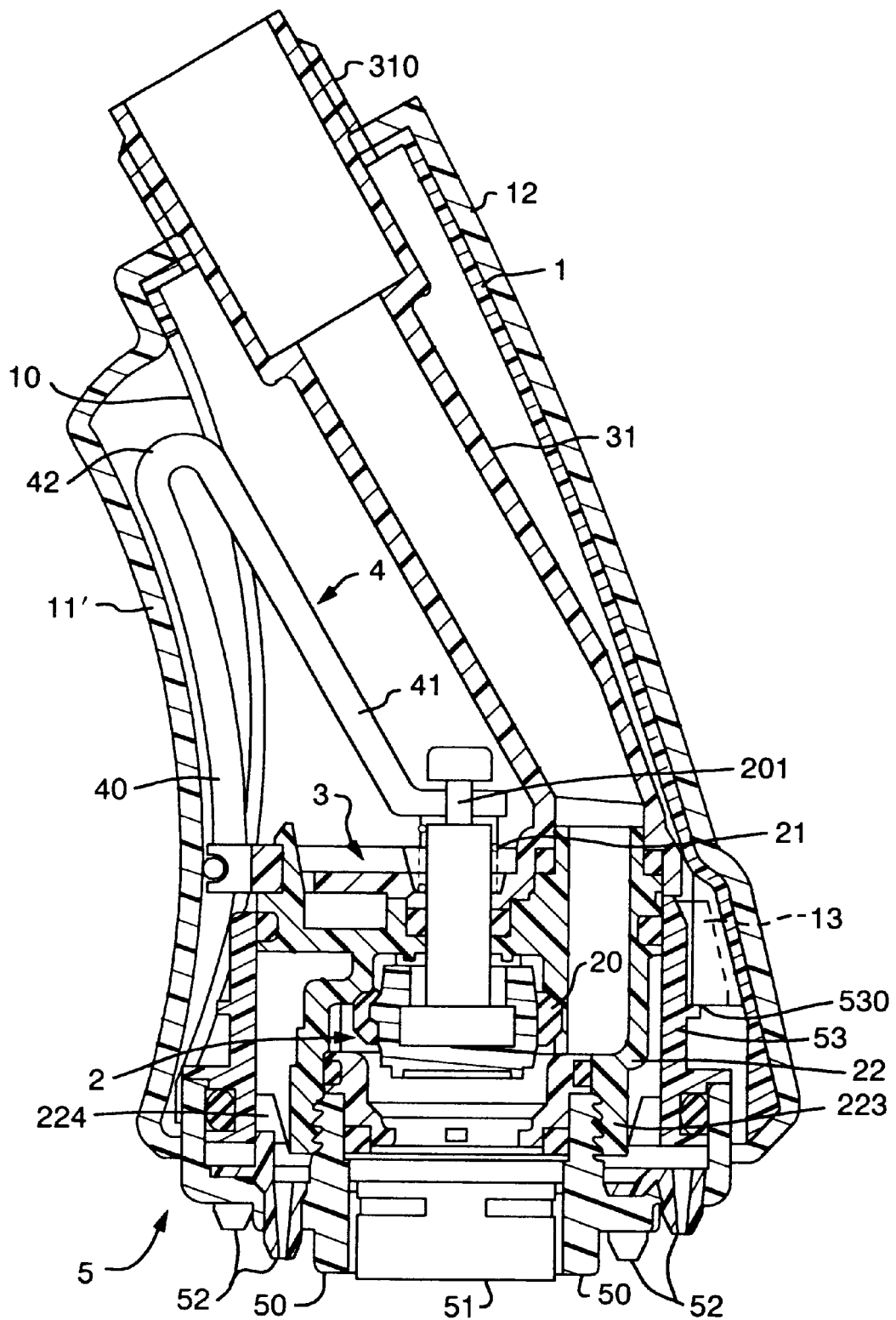
FIG. 13 is a view like FIG. 2 of an alternative valve in accordance with the invention.

In the arrangement of FIG. 13 the entire head body 1 is surrounded by a flexible cover 12 that forms an integral membrane 11'.

We claim:

1. A faucet comprising:

a tubular faucet arm;

a water-pressurizable hose in the arm having an outer end;

a head housing mounted on the hose outer end, extending along an axis, formed with a radially throughgoing slot, and dimensioned to be grasped in one hand;

body structure in the head communicating with the hose outer end and forming first and second valve seats;

a nozzle assembly mounted on the body structure and forming a first outlet communicating with the first valve seat and a second outlet communicating with the second valve seat;

means including a valve element displaceable in the body structure between a first end position engaging the first seat and diverting flow from the hose to the first outlet and a second end position engaging the second seat and diverting flow from the hose to the second outlet;

a V-shaped lever partially projecting through the slot from the housing, having a pair of arms joined at a bight and having outer ends, and pivoted at an outer end of one of the lever arms on the body structure, the bight projecting out through the slot; and means coupling the outer end of the other lever arm of the lever to the valve element for displacing the valve element from the first end position to the second end position on depression of the lever toward the housing.

2. The faucet defined in claim 1, further comprising a spring braced between the body structure and the valve element and urging the valve element into the first end position.

3. The faucet defined in claim 1 wherein the one arm is arcuate.

4. The faucet defined in claim 1, further comprising a flexible membrane covering the head housing at the slot and engaged over the one arm and bight of the lever.

5. The faucet defined in claim 4 wherein the membrane covers the entire head housing and has a raised portion at the slot.

6. The faucet defined in claim 1 wherein the lever is unitarily formed of plastic with a pair of pivot pins, the structure having seats receiving the pins.

7. The faucet defined in claim 1 wherein the body structure includes:

a head body formed with a tubular stem connected to the hose and forming a passage and with a base plate formed with a seat pivotally supporting the other-arm outer end; and a valve body mounted on the head body and forming the seats, the passage opening between the seats.

8. The faucet defined in claim 7 wherein the tubular stem extends at an angle of about 60° to a plane of the base plate.

9. The faucet defined in claim 7 wherein the valve body is formed with barbed snap arms that elastically engage and hold the head body.

10. The faucet defined in claim 7 wherein the valve body is formed with a threaded seat and the valve nozzle assembly is threaded into the seat, the first outlet being a central stream outlet and the second outlet being an annular array of nozzles surrounding the central stream outlet.

11. The faucet defined in claim 7 wherein the bodies are formed with an axially throughgoinq sealed hole and the valve element has a stem sealingly engaged in the hole and having an upper end connected to the one-arm outer end and a lower end formed with a valve ring sealingly engageable with the seats.

12. The faucet defined in claim 11 wherein the valve-element upper end is formed with an annular outwardly open groove and the one-arm outer end is forked and engaged in the groove.

13. The faucet defined in claim 1 wherein the head housing flares away from the hose.

14. The faucet defined in claim 13 wherein the structure is formed with a support rib, the faucet further comprising a nut securing the hose to the structure and retaining the head housing against the support rib.

15. The faucet defined in claim 14 wherein the nut fits snugly in an end of the faucet arm.

16. The faucet defined in claim 1 wherein the head housing has an axial length equal to about twice its largest diameter.

17. The faucet defined in claim 1 wherein the faucet arm and the housing are curved and meet at a region of similar curvature, the housing having at the region a diameter slightly greater than a diameter of the faucet arm at the region and flaring outward from the region, the slot being on an inner side of a curvature of the head housing.

* * * * *